US009896058B2

United States Patent
Kobayashi et al.

(10) Patent No.: US 9,896,058 B2
(45) Date of Patent: Feb. 20, 2018

(54) GAS GENERATOR

(71) Applicant: DAICEL CORPORATION, Osaka-shi, Osaka (JP)

(72) Inventors: Tomoharu Kobayashi, Tatsuno (JP); Teppei Hanano, Tatsuno (JP)

(73) Assignee: DAICEL CORPORATION, Osaka-shi (JP)

( * ) Notice: Subject to any disclaimer, the term of this patent is extended or adjusted under 35 U.S.C. 154(b) by 0 days.

(21) Appl. No.: 15/509,609

(22) PCT Filed: Aug. 24, 2015

(86) PCT No.: PCT/JP2015/073649
§ 371 (c)(1),
(2) Date: Mar. 8, 2017

(87) PCT Pub. No.: WO2016/051997
PCT Pub. Date: Apr. 7, 2016

(65) Prior Publication Data
US 2017/0282844 A1 Oct. 5, 2017

(30) Foreign Application Priority Data
Sep. 29, 2014 (JP) .................................. 2014-197897

(51) Int. Cl.
*B60R 21/274* (2011.01)
*B60R 21/272* (2006.01)

(52) U.S. Cl.
CPC .......... *B60R 21/272* (2013.01); *B60R 21/274* (2013.01)

(58) Field of Classification Search
CPC ........................... B60R 21/274; B60R 21/272
(Continued)

(56) References Cited

U.S. PATENT DOCUMENTS 5,345,876 A * 9/1994 Rose ..................... B60R 21/272
102/531
5,570,904 A 11/1996 Cuevas
(Continued)

FOREIGN PATENT DOCUMENTS

JP 8-85410 A 4/1996
JP 10-230814 A 9/1998
(Continued)

*Primary Examiner* — Reginald S Tillman, Jr.
(74) *Attorney, Agent, or Firm* — Birch, Stewart, Kolasch & Birch, LLP

(57) ABSTRACT

The present invention provides a gas generator including, an ignition device chamber, a gas inflow chamber, and a pressurized gas chamber being arranged from a first end fixed with an ignition device to a second end opposite thereto in a cylindrical housing, an inner circumferential wall surface of the cylindrical housing, from the ignition device chamber to the gas inflow chamber, having a first movement restricting portion, a second movement restricting portion and a stopping portion which are arranged in an axial direction at intervals in the above order so as to protrude, the second movement restricting portion having an ignition device chamber-side surface which is an inclined surface decreasing an inner diameter of the housing from the side of the ignition device chamber to the side of the gas inflow chamber and a gas inflow chamber-side surface whose angle ($\alpha 1$) with respect to the cylindrical housing is not more than 90 degrees, so that an axial cross-sectional shape of the second movement restricting portion is a triangle, a breaking device being arranged between the ignition device chamber and the gas inflow chamber and including a base whose outer circumferential surface abuts against an inner circumferential wall surface of the cylindrical housing and a distal end having an enlarged-diameter portion, and before actuation, the base being held between the first movement restricting portion and the second move-
(Continued)

ment restricting portion, after actuation, the base being held between the surface of the second movement restricting portion whose angle α1 is not more than 90 degrees and the stopping portion.

4 Claims, 3 Drawing Sheets

(58) Field of Classification Search
USPC .................................................. 102/530, 531
See application file for complete search history.

(56) References Cited

U.S. PATENT DOCUMENTS

| | | | |
|---|---|---|---|
| 5,656,463 A * | 8/1997 | Slesarev | C12N 9/90 |
| | | | 435/233 |
| 6,010,153 A | 1/2000 | Halas et al. | |
| 6,231,079 B1 | 5/2001 | Perotto et al. | |
| 6,499,764 B2 | 12/2002 | Anacker et al. | |
| 6,676,157 B2 * | 1/2004 | Nanbu | B60R 21/268 |
| | | | 280/736 |
| 7,588,265 B2 * | 9/2009 | Blackburn | B60R 21/268 |
| | | | 280/737 |
| 9,751,492 B2 * | 9/2017 | Kobayashi | B60R 21/272 |
| 2008/0284148 A1 | 11/2008 | Bjorklund et al. | |
| 2014/0123868 A1 | 5/2014 | Kobayashi | |
| 2014/0208975 A1 * | 7/2014 | Kobayashi | B60R 21/272 |
| | | | 102/530 |
| 2016/0207493 A1 * | 7/2016 | Kobayashi | B60R 21/272 |
| 2017/0015273 A1 * | 1/2017 | Kobayashi | B60R 21/268 |
| 2017/0080894 A1 * | 3/2017 | Kobayashi | B60R 21/272 |
| 2017/0282843 A1 * | 10/2017 | Fukumoto | B60R 21/274 |

FOREIGN PATENT DOCUMENTS

| | | |
|---|---|---|
| JP | 2000-354756 A | 12/2000 |
| JP | 2008-509834 A | 4/2008 |
| JP | 2014-94614 A | 5/2014 |

\* cited by examiner

[Fig. 1]
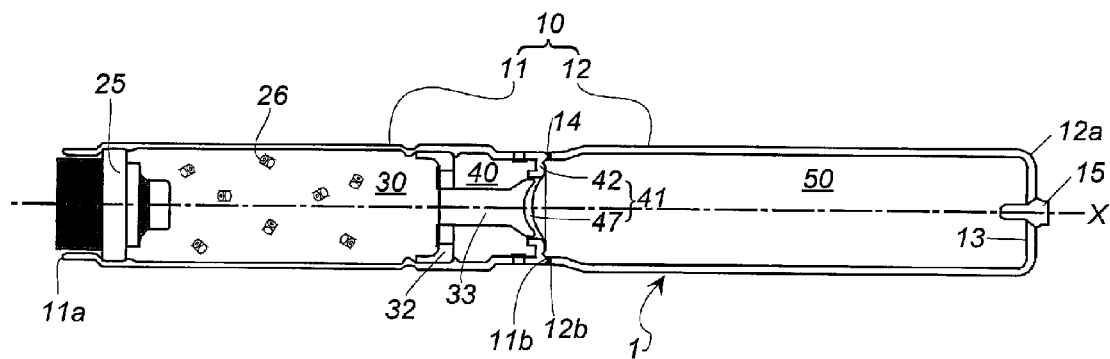
[Fig. 2]
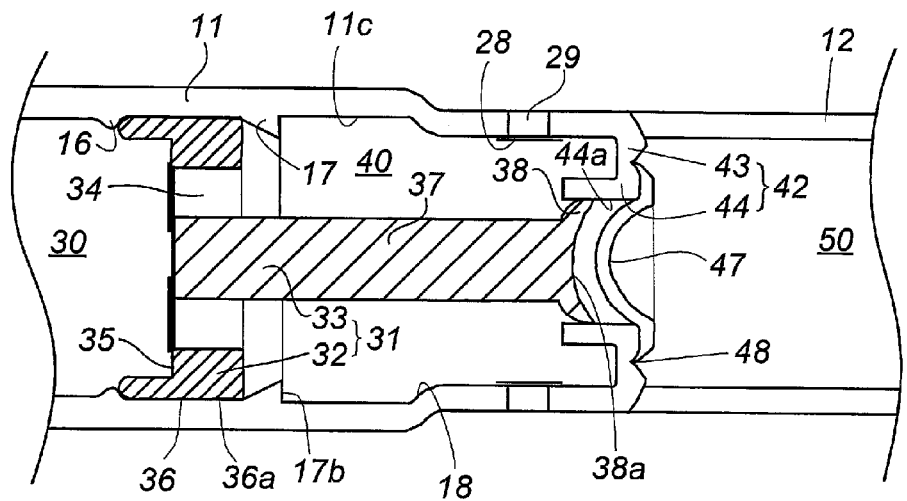

[Fig. 3]
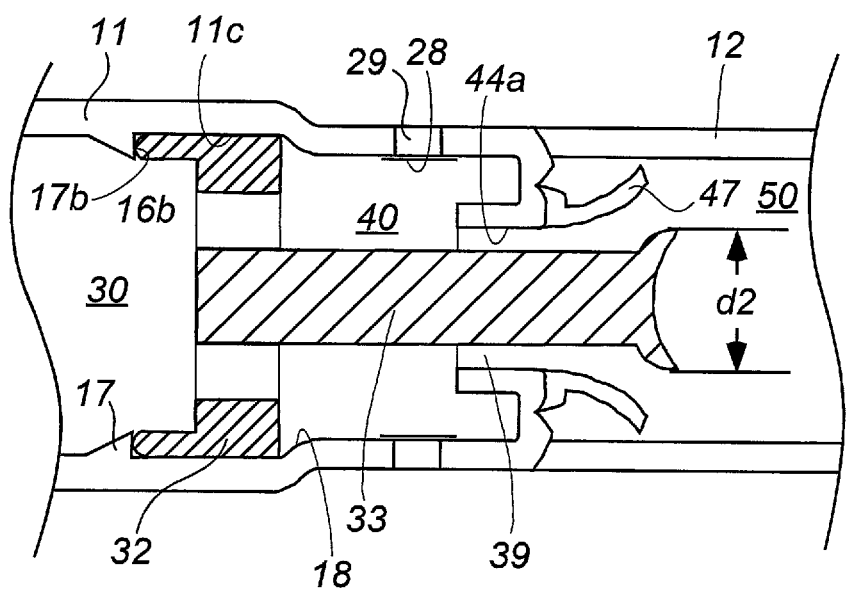

[Fig. 4]
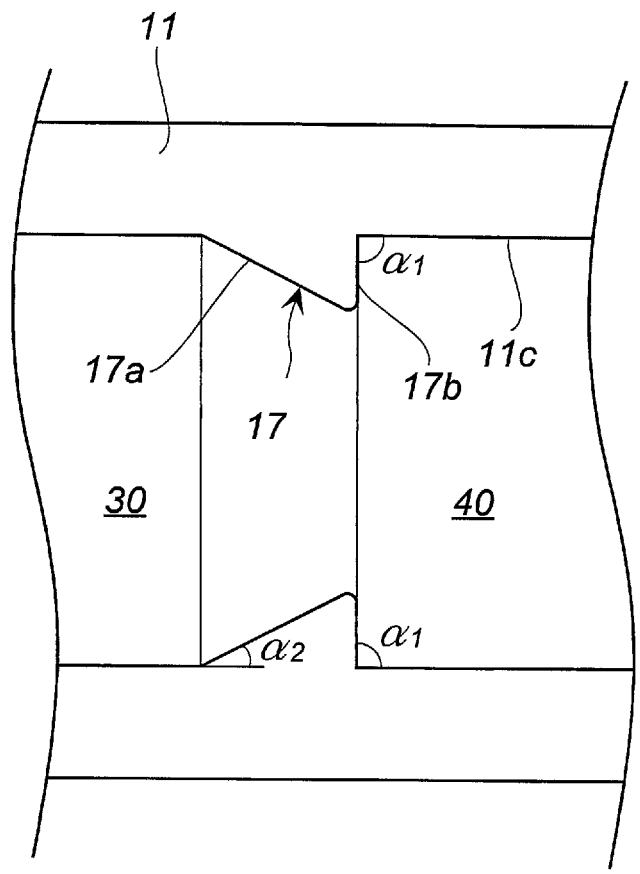
[Fig. 5]
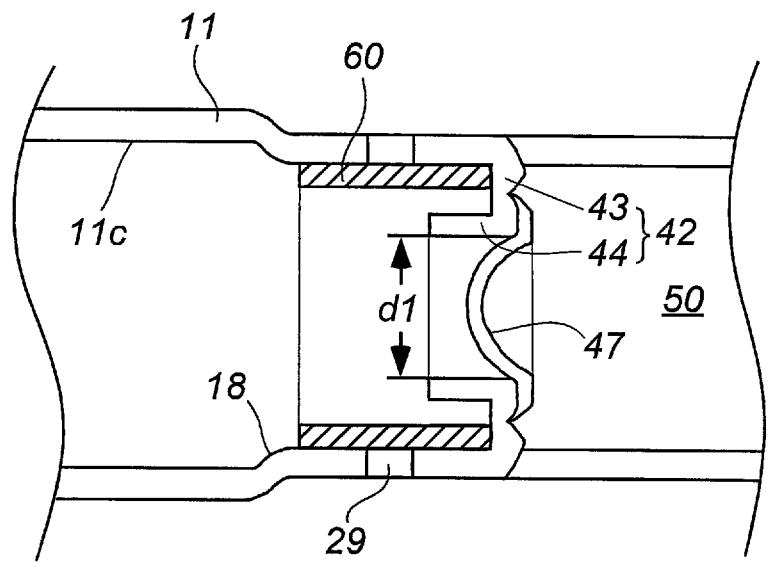

GAS GENERATOR

TECHNICAL FIELD

The present invention relates to a gas generator which is usable for an airbag apparatus to be installed on a vehicle and in which a pressurized gas is used.

DESCRIPTION OF RELATED ART

A gas generator in which a pressurized gas is used requires a device for breaking and opening a closing member for sealing the pressurized gas. Furthermore, in order to control a flow rate of the gas after the closing member is opened, it is also important that a cross-sectional area of the opening is kept constant.

In FIGS. 9 and 10 in U.S. Pat. No. 6,499,764, such an embodiment is shown that a movement of a piston 65 including a piston rod 66 and a piston foot 67 causes a closure element 38, which is fixed to a cover 40, to be broken by the piston foot 67.

After breaking the closure element 38, the piston foot 67 abuts against an indentation 60 of a diffuser head 13b.

Due to the breaking of the closure element 38, an opening 39 is formed and a pressurized gas inside a pressurized gas chamber 11 flows out from a gap 69 between the opening 39 and the piston rod 66.

In JP-A No. H08-85410, FIG. 1 depicts a state before operation and FIG. 2 depicts a state after operation. In Paragraph 0025, it is described that when a canister 64 moves from a position depicted in FIG. 1 to a position depicted in FIG. 2, a tab member 99 moves from a retracted state depicted in FIG. 1 to an extended state depicted in FIG. 2 and, when the tab member 99 is in the extended state depicted in FIG. 2, the tab member 99 frictionally engages with an inner surface of a side wall portion 20 and prevents the canister 64 from moving rearward towards the position depicted in FIG. 1.

SUMMARY OF INVENTION

The present invention provides a gas generator including,
a cylindrical housing having a first end whose opening is fixed with an ignition device, and a closed second end on an axially opposite side of the first end, the cylindrical housing including an ignition device chamber provided with the ignition device, a gas inflow chamber having a gas discharge port, and a pressurized gas chamber,
the ignition device chamber, the gas inflow chamber and the pressurized gas chamber being arranged in the cylindrical housing, in the above order from the first end,
an inner circumferential wall surface of the cylindrical housing from the ignition device chamber to the gas inflow chamber, having a first movement restricting portion, a second movement restricting portion and a stopping portion which are arranged in an axial direction at intervals in the above order so as to protrude,
the second movement restricting portion having an ignition device chamber-side surface which is an inclined surface decreasing an inner diameter of the housing from the side of the ignition device chamber to the side of the gas inflow chamber and a gas inflow chamber-side surface whose angle ($\alpha 1$) with respect to the cylindrical housing is not more than 90 degrees, so that an axial cross-sectional shape of the second movement restricting portion is a triangle,
a closing means closing between the pressurized gas chamber and the gas inflow chamber, the closing means including,
a fixing portion extended radially inward from the inner circumferential wall surface of the cylindrical housing and
a rupturable plate fixed to the fixing portion, and
a breaking device for the rupturable plate being arranged between the ignition device chamber and the gas inflow chamber, the breaking device including,
a base whose outer circumferential surface abuts against the inner circumferential wall surface of the cylindrical housing and
a rod which extends from the base towards the rupturable plate, the rod including a rod main body portion which extends from the base, and an enlarged-diameter portion which has a diameter enlarged radially at a distal end portion of the rod main body portion,
before actuation, the base of the breaking device being held between the first movement restricting portion and the second movement restricting portion to fix the breaking device,
after actuation, the base of the breaking device being held between gas inflow chamber-side the surface of the second movement restricting portion whose angle $\alpha 1$ is not more than 90 degrees and the stopping portion to stop movement of the breaking device towards both sides in the axial direction.

BRIEF DESCRIPTION OF DRAWINGS

The present invention will become more fully understood from the detailed description given hereinbelow and the accompanying drawings which are given by way of illustration only, and thus are no imative of the present invention and wherein:

FIG. 1 shows a cross-sectional view in an X-axis direction of a gas generator of the present invention;

FIG. 2 shows a partially enlarged view (before actuation) of FIG. 1;

FIG. 3 shows a partially enlarged view of FIG. 1 depicting a state after actuation;

FIG. 4 shows a partially enlarged view of a second movement restricting portion (a second protrusion) depicted in FIG. 1; and FIG. 5 shows a partially enlarged view of FIG. 1 depicting another embodiment.

DETAILED DESCRIPTION OF INVENTION

The embodiment depicted in FIGS. 9 and 10 of U.S. Pat. No. 6,499,764 does not disclose a means for fixing the rod 66 radially, and it is unclear as to whether the cross-sectional area of the gap 69 can be kept constant.

In JP-A No. H08-85410, although details of the tab member 99 are not provided, it is clear in FIG. 2 that the tab member 99 is in contact with an inner surface of the side wall portion 20 by an extremely small area and that a stopping device is not formed on the inner surface of the side wall portion 20. Therefore, the tab member 99 cannot be sufficient as a movement stopping means for the canister 64.

The present invention provides a gas generator which is usable for an airbag apparatus to be installed on a vehicle and in which a pressurized gas is used. The gas generator is capable of maintaining the reliability of actuation over the service period of the vehicle.

The ignition device chamber includes a known electric igniter used in a gas generator for an airbag apparatus. If necessary, a transfer charge or a gas generating agent can be used therewith.

A gas generated from the gas generating agent can be used for airbag deployment.

The pressurized gas chamber is filled with a gas such as argon, helium, or nitrogen gas under a required pressure.

The gas discharge port is formed in the cylindrical housing at a location where the gas inflow chamber is formed. A cylindrical filter can be disposed at a position such as to cover the gas discharge port from the inside.

The inner circumferential wall surface of the cylindrical housing from the ignition device chamber to the gas inflow chamber has the first movement restricting portion, the second movement restricting portion and the stopping portion which are formed at intervals in an axial direction in the above order.

The first movement restricting portion is only to prevent the breaking device (the base) from moving towards the ignition device chamber before actuation.

The second movement restricting portion is only to prevent the breaking device (the base) from moving towards the rupturable plate (the pressurized gas chamber) before actuation.

The stopping portion is only to stop the breaking device which has moved in the axial direction during actuation.

The first movement restricting portion can be a portion where the inner diameter of the cylindrical housing is decreased, a portion formed with an annular protrusion, a portion formed with independent protrusions which are arranged annularly, or the like.

The second movement restricting portion can be a portion formed with an annular protrusion, a portion formed with independent protrusions which are arranged annularly, or the like.

The second movement restricting portion has a triangular cross-sectional shape in the axial direction.

The ignition device chamber-side surface of the second movement restricting portion is an inclined surface which decreases the inner diameter of the housing from the ignition device chamber towards the gas inflow chamber.

The gas inflow chamber-side surface of the second movement restricting portion is a surface whose angle ($\alpha 1$) between the gas inflow chamber-side surface and the cylindrical housing is 90 degrees or less.

The angle ($\alpha 1$) preferably ranges from 45 to 90 degrees.

The stopping portion can be a portion where the inner diameter of the cylindrical housing is decreased, a portion formed with an annular protrusion, a portion formed with independent protrusions which are arranged annularly, or the like.

The closing means closes between the pressurized gas chamber and the gas inflow chamber and includes the fixing portion extended radially inward from the inner circumferential wall surface of the cylindrical housing and the rupturable plate fixed to the fixing portion.

The breaking device for the rupturable plate is disposed between the ignition device chamber and the gas inflow chamber.

The breaking device includes the base and the rod extending from the base towards the rupturable plate.

The outer circumferential surface of the base abuts against the inner circumferential wall surface of the cylindrical housing.

During actuation, the breaking device slides in the axial direction in a state where the base abuts against the inner circumferential wall surface of the cylindrical housing, and the base and the rod integrally move in the axial direction (towards the rupturable plate) to break the rupturable plate.

The rod includes the rod main body portion and the enlarged-diameter portion with a diameter enlarged radially from the rod main body portion, and the enlarged-diameter portion is positioned at the distal end portion of the rod.

Further, an end surface of the distal end portion of the rod including the enlarged-diameter portion may have an overall shape that is recessed towards a center from an outer periphery (for example, a curved shape). Such a shape makes it easier to capture the punched-out rupturable plate with the recess.

Before actuation, the base of the breaking device is held between the first movement restricting portion and the second movement restricting portion to fix the breaking device.

As a result, the breaking device is prevented from moving in the axial direction due to vibration applied from the outside.

During actuation, the base of the breaking device moves over the inclined surface of the second movement restricting portion and is held between the gas inflow chamber-side surface of the second movement restricting portion whose angle $\alpha 1$ is 90 degrees or less and the stopping portion. Thereby, the axial movement of the breaking device to both sides is stopped.

With a surface whose angle $\alpha 1$ is larger than 90 degrees, the base may possibly be pushed by a gas flowing from the pressurized gas chamber to the gas inflow chamber and moved in reverse. However, with a surface whose angle $\alpha 1$ is 90 degrees or less than 90 degrees, a reverse movement of the base does not occur. Therefore, in FIGS. 1 and 2, after the breaking device moves in the X-axis direction, an annular gap with a constant cross-sectional area is formed between the rod main body portion and a cylindrical wall portion 44 of a fixing portion 42. Thereby, a flow rate of the pressurized gas when flowing through a discharge path from the pressurized gas chamber to the gas discharge port is determined by the annular gap, and output of the gas generator is stabilized. From the above, the rod main body portion is preferably formed so as to have a constant outer diameter between a enlarged-diameter portion and the base.

In the gas generator of the above-described invention, it is possible that the base and the rod are integrated in the breaking device, and the base includes a disk portion having a through hole in a thickness direction thereof, and an outer circumferential surface of the disk portion abuts against the inner circumferential wall surface of the cylindrical housing so as to slide in the axial direction.

Since the base and the rod are integrated in the breaking device, during actuation, the base slides on the inner circumferential wall surface of the cylindrical housing and moves towards the rupturable plate, and the rod collides with, breaks and opens the rupturable plate.

When the ignition device chamber is filled with a gas generating agent, the through hole of the base functions as a passage hole of a combustion gas.

The through hole of the base may be closed with a seal tape made of aluminum or the like. Moreover, the term "integrated" used herein refers to maintaining an integrated state during actuation of the gas generator. The base and the rod may be formed of separate parts to be fixed by a method such as welding.

In the gas generator of the above-described invention, it is possible that the base and the rod are integrated in the breaking device, and the base includes a disk portion having a through hole in a thickness direction thereof and a cylindrical wall surface portion extending from an outer circumference of the disk portion towards the ignition device, and an outer circumferential surface of the cylindrical wall surface portion abuts against the inner circumferential wall surface of the cylindrical housing so as to slide in the axial direction.

Since the base and the rod are integrated in the breaking device, during actuation, the base slides on the inner circumferential wall surface of the cylindrical housing and moves towards the rupturable Plate, and the rod collides with, breaks and opens the rupturable plate.

Since the base includes a disk portion and an annular wall surface portion, as compared to a base only including the disk portion, a contact surface with the inner circumferential wall surface of the cylindrical housing increases and the base slides less readily. However, it is advantageous in that a central axis of the rod during sliding is less likely to wobble.

However, the contact area with the inner circumferential wall surface of the housing may be reduced by recessing part of the cylindrical wall surface portion.

When the ignition device chamber is filled with a gas generating agent, the through hole of the base functions as a passage hole of a combustion gas.

The through hole of the base may be closed with a seal tape made of aluminum or the like.

When the gas generator of the present invention is used in an airbag apparatus of a vehicle, the gas generator remains reliable in actuation over the service period of the vehicle.

EMBODIMENTS OF INVENTION (1) Gas generator depicted in FIGS. 1 to 3

In a gas generator 1 depicted in FIG. 1, an ignition device chamber 30, a gas inflow chamber 40, and a pressurized gas chamber 50 are arranged inside a cylindrical housing 10.

The cylindrical housing 10 includes an ignition device chamber housing 11 and a pressurized gas chamber housing 12, but may be formed of a single housing as a whole.

In the ignition device chamber housing 11, an electric igniter 25 is fixed to an opening at a first end 11a.

A second end 12a of the pressurized gas chamber housing 12 is closed (a closing surface 13).

An opening at a second end 11b of the ignition device chamber housing 11 and an opening at a first end 12b of the pressurized gas chamber housing 12 are integrated by welding in a joint portion 14.

The cylindrical housing 10 (the ignition device chamber housing 11 and the pressurized gas chamber housing 12) is made of iron, stainless steel, or the like.

The inside of the pressurized gas chamber 50 is filled with a gas such as argon or helium under high pressure.

The gas is loaded from a gas filling hole in the closing surface 13 of the pressurized gas chamber housing 12.

A pin 15 is inserted into the gas filling hole after the gas is filled, and then welded together with the closing surface 13 to close the gas filling hole.

A closing means 41 closes between the pressurized gas chamber 50 and the gas inflow chamber 40.

The closing means 41 includes a fixing portion 42 and a rupturable plate 47 fixed by welding to the fixing Portion 42.

The fixing portion 42 includes an annular plate surface portion 43 extended radially inward from the second end 11b of the ignition device chamber housing 11 and a cylindrical wall portion 44 extended from an inner circumferential portion of the annular plate surface Portion 43 towards the gas inflow chamber 40 (refer to FIG. 2).

A boundary portion between the annular plate surface portion 43 and the cylindrical wall portion 44 of the fixing portion 42 is a curved surface.

A surface of the annular plate surface portion 43 of the fixing portion 42 on a side of the pressurized gas chamber 50 has an annular groove 48 (refer to FIG. 2).

The rupturable plate 47 is made of iron, stainless steel, or the like. A peripheral portion of the rupturable plate 47 is abutted against the annular groove 48 formed in the annular plate surface portion. 43 of the fixing portion 42, and in this state, the rupturable plate 47 is fixed by welding at the abutting Portion. In this case, since pressure of the pressurized gas filled in the pressurized gas chamber 50 causes the rupturable plate 47 to deform towards the gas inflow chamber 40 along the curved surface portion of the boundary portion between the annular plate surface portion 43 and the cylindrical wall portion 44, the curved surface portion prevents stress from concentrating on the rupturable plate in the boundary portion. Accordingly, pressure resistance of the rupturable plate is improved.

The gas inflow chamber 40 is a space into which the gas from the pressurized gas chamber 50 and a combustion gas from the ignition device chamber 30 flow during actuation.

In FIG. 2, a plurality of gas discharge ports 29 are formed at a location facing the gas inflow chamber 40 in the ignition device chamber housing 11.

The plurality of the gas discharge ports 29 are formed equidistantly in the circumferential direction of the ignition device chamber housing 11.

A known filter 60 may be disposed at a position such as to cover the gas discharge ports 29 of the gas inflow chamber 40 from the inside (FIG. 5).

A breaking device 31 including a base 32 and a rod 33 extending from the base 32 towards the rupturable plate 47 is disposed between the gas inflow chamber 40 and the ignition device chamber 30.

In the breaking device 31 depicted in FIGS. 1 to 3, the base 32 and the rod 33 are integrated.

The base 32 includes a disk portion 35 having a plurality of through holes 34 in a thickness direction and a cylindrical wall surface portion 36 extending from an outer circumference of the disk portion 35 towards the igniter 25.

The through holes 34 are closed, from the ignition device chamber 30, with a seal tape made of aluminum.

In the base 32, an outer circumferential surface 36a of the cylindrical wall surface portion 36 abuts against the inner circumferential wall surface 11c of the ignition device chamber housing 11 such that the base 32 can slide in the X-axis direction. Since a length of the cylindrical wall surface portion 36 in the axial direction (the X-axis direction) is larger than the thickness of the disk portion 35, the rod 33 is not inclined with respect to the X-axis and the base 32 slides parallel to the X-axis direction.

A sealing agent is coated between the outer circumferential surface 36a of the cylindrical wall surface portion 36 and the inner circumferential wall surface 11c of the ignition device chamber housing 11 to ensure air tightness of the ignition device chamber 30.

The rod 33 includes a rod main body portion 37 extending from the base 32 and an enlarged-diameter Portion 38 with a diameter enlarged radially outward from the rod main body portion 37.

A diameter (d2) of the enlarged-diameter portion 38 is smaller than an inner diameter (d1) of the cylindrical wall portion 44.

A surface 38a (refer to FIG. 2) of the enlarged-diameter portion 38 of the rod 33 has a shape curved towards a center as depicted in FIGS. 1 to 3. However, for example, the surface 38a may be a rectangularly recessed concave portion.

The breaking device 31 and the closing means 41 are arranged such that the enlarged-diameter portion 38 which is a distal end portion of the rod 33 is enclosed by the cylindrical wall portion 44 of the fixing portion 42 before actuation. In this case, a slight gap is formed between an outer circumferential portion of the enlarged-diameter portion 38 and an inner circumferential surface 44a of the cylindrical wall portion 44 (d1>d2, where d1/d2 assumes a numerical value approaching 1).

In the ignition device chamber 30, the igniter 25 is fixed at the first end 11a, and the apposite side thereof in the X-axis direction is partitioned by the base 32.

The inside of the ignition device chamber 30 is filled with a predetermined amount of a molded article of a gas generating agent 26.

An inner circumferential wall surface 11c of the cylindrical housing from the ignition device chamber 30 to the gas inflow chamber 40 has, in the following order, a first protrusion 16 corresponding to a first movement restricting portion, a second protrusion 17 corresponding to a second movement restricting portion, and a reduced-diameter portion 18 corresponding to a stopping portion which are formed at intervals in an axial direction.

The first protrusion 16 may be an annular protrusion or a plurality of protrusions arranged annularly.

A protrusion which has a height capable of preventing the breaking device 31 from moving in the X-axis direction (towards the ignition device chamber 30) before actuation is satisfactory as the first protrusion 16.

The second protrusion 17 can be an annular protrusion or a plurality of protrusions arranged annularly and, as depicted in FIGS. 2 to 4, the second protrusion 17 has a triangular cross-sectional shape in the X-axis direction.

An ignition device chamber 30-side surface 17a is an inclined surface which decreases an inner diameter of the housing from the side of the ignition device chamber 30 to the side of the gas inflow chamber 40. The inclined surface can be an inclined surface whose angle α2 depicted in FIG. 4 (an angle of the inclined surface 17a relative to the inner circumferential wall surface 11c) ranges from around 5 to 30 degrees.

A gas inflow chamber 40-side surface 17b is a surface (a perpendicular surface) whose angle α1 between the surface 17b and the inner circumferential wall surface 11c of the cylindrical housing is 90 degrees.

The reduced-diameter portion (a step portion) 18 is a step portion in which a step is obtained by reducing the inner diameter of the cylindrical housing 11, and alternatively, the reduced-diameter portion 18 may be an annular protrusion or a plurality of protrusions arranged annularly.

Next, the operation of the gas generator 1 depicted in FIG. 1 will be explained with reference to FIGS. 1 to 5.

Before actuation (the state depicted in FIGS. 1 and 2), the cylindrical wall surface portion 36 of the base 32 of the breaking device is fixed by being held from both sides in a thickness direction by the first protrusion 16 and the second protrusion 17.

Although vibration may be applied from the outside before actuation when an airbag apparatus mounted with the gas generator is mounted to a vehicle, the breaking device 31 (the base 32) is prevented from moving in the X-axis direction even by such vibration.

In addition, when the gas generator 1 is used as a gas generator for an airbag system of a vehicle, the gas generator 1 is to be continuously used for 10 years or more until a service period of the vehicle expires.

Therefore, the closing means 41 is to be continuously subjected to high pressure from the pressurized gas chamber 50.

When pressure is continuously applied in this manner, the annular plate surface portion 43 of the fixing portion 42 conceivably deforms from around the boundary portion between the annular plate surface portion 43 and the ignition device chamber housing 11, and towards the gas inflow chamber 40. As a result, an end of the cylindrical wall portion 44 on the side of the gas inflow chamber 40 deforms radially outward to cause d1 (FIG. 5) of the cylindrical wall portion 44 to increase.

Immediately after assembly of the gas generator 1, a slight gap is formed between the enlarged-diameter portion 38 (the outer diameter d2; refer to FIG. 3) of the rod 33 and the inner circumferential wall surface 44a of the cylindrical wall portion 44 (in other words, d1>d2). When a deformation, that increases d1, occurs as described above, the relationship expressed by d1>d2 is further enhanced (a difference expressed by d1−d2 increases).

Therefore, even when a deformation of the fixing portion 42 occurs after a lapse of 10 years or more from immediately after assembly of the gas generator 1, since the relationship expressed by d1>d2 is maintained, sliding of the breaking device 31 in the X-axis direction is not affected.

The molded article of the gas generating agent 26 is ignited and burned by the combustion products generated by the actuation of the igniter 25, and a high-temperature combustion gas is produced.

When pressure inside the ignition device chamber 30 is raised by the combustion gas, the base 32 of the breaking device 31 moves over the inclined surface 17a of the second protrusion 17 and slides and moves along the inner circumferential wall surface 11c of the ignition device chamber housing in the X-axis direction.

While the base 32 then stops as a result of colliding with the step portion 18 obtained by a reduced inner diameter, since the enlarged-diameter portion 38 of the rod 33 collides with and breaks the rupturable plate 47, the gas inside the pressurized gas chamber 50 flows into the gas inflow chamber 40 through the annular gap 39 between the opening (the inner circumferential surface 44a of the cylindrical wall portion 44) of the rupturable plate 47 and the rod main body portion 37 (FIG. 3).

In parallel with this, the seal tape closing the through holes 34 of the base 32 is broken by pressure of the combustion gas and the combustion gas flows from the through holes 34 into the gas inflow chamber 40.

In the state depicted in FIG. 3, if the inflow of the gas from the annular gap 39 into the gas inflow chamber 40 causes the breaking device 31 (the base 32) under pressure to move over the second protrusion 17 and return to the side of the ignition device chamber 30 and causes the enlarged-diameter portion 38 to be positioned inside the inner circumferential surface 44a of the cylindrical wall portion 44, a cross-sectional area of the annular gap 39 changes and a stable gas flow rate can no longer be maintained.

In the gas generator 1 of the present invention, as depicted in FIG. 2 and FIG. 3, since the angle α1 of the perpendicular surface 17b of the second protrusion 17 is 90 degrees, the breaking device 31 (the base 32) does not move over the second protrusion 17 and return to the side of the ignition device chamber 30. As a result, the cross-sectional area of the annular gap 39 is kept constant. In order to realize the function described above, a distance over which the breaking device moves in the X-axis direction during actuation is set larger than a distance between the surface 38a of the enlarged-diameter portion 38 and the rupturable plate 47 before actuation. In addition, in the gas generator of the present invention, the cross-sectional area of the annular gap 39 is set smallest on a discharge path of the pressurized gas from the pressurized gas chamber 50 to the gas discharge port 29.

The fixing portion 42 includes the cylindrical wall portion 44 and thereby, the cylindrical wall portion 44 exhibits a guiding function to cause the breaking device 31 to reliably collide with the rupturable plate 47 even when the central axis of the rod 33 deviates during sliding of the breaking device 31 (the base 32).

The combustion gas and the Pressurized gas flowing into the gas inflow chamber 40 are discharged from the gas discharge ports 29.

It is conceivable that the combustion gas and the pressurized gas are discharged such that, after part of either one of the gases is discharged from the gas discharge ports 29, the remaining gases are discharged as a gas mixture. However, the gas discharge state or timing is not limited.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising,
   a cylindrical housing having a first end whose opening is fixed with an ignition device, and a closed second end on an axially opposite side of the first end, the cylindrical housing including an ignition device chamber provided with the ignition device, a gas inflow chamber having a gas discharge port, and a pressurized gas chamber,
   the ignition device chamber, the gas inflow chamber and the pressurized gas chamber being arranged in the cylindrical housing, in the above order from the first end,
   an inner circumferential wall surface of the cylindrical housing from the ignition device chamber to the gas inflow chamber, having a first movement restricting portion, a second movement restricting portion and a stopping portion which are arranged in an axial direction at intervals in the above order so as to protrude,
   the second movement restricting portion having an ignition device chamber-side surface which is an inclined surface decreasing an inner diameter of the housing from the side of the ignition device chamber to the side of the gas inflow chamber and a gas inflow chamber-side surface whose angle (α1) with respect to the cylindrical housing is not more than 90 degrees, so that an axial cross-sectional shape of the second movement restricting portion is a triangle,
   a closing means closing between the pressurized gas chamber and the gas inflow chamber, the closing means including,
      a fixing portion extended radially inward from the inner circumferential wall surface of the cylindrical housing and
      a rupturable plate fixed to the fixing portion, and
   a breaking device for the rupturable plate being arranged between the ignition device chamber and the gas inflow chamber, the breaking device including,
      a base whose outer circumferential surface abuts against the inner circumferential wall surface of the cylindrical housing and
      a rod which extends from the base towards the rupturable plate, the rod including a rod main body portion which extends from the base, and an enlarged-diameter portion which has a diameter enlarged radially at a distal end portion of the rod main body portion,
   before actuation, the base of the breaking device being held between the first movement restricting portion and the second movement restricting portion to fix the breaking device,
   after actuation, the base of the breaking device being held between the gas inflow chamber-side surface of the second movement restricting portion whose angle α1 is not more than 90 degrees and the stopping portion to stop movement of the breaking device towards both sides in the axial direction.

2. The gas generator according to claim 1, wherein the angle α1 ranges from 45 to 90 degrees.

3. The gas generator according to claim 1, wherein
   the base and the rod are integrated in the breaking device, and
   the base includes a disk portion having a through hole in a thickness direction thereof, and an outer circumferential surface of the disk portion abuts against the inner circumferential wall surface of the cylindrical housing so as to slide in the axial direction.

4. The gas generator according to claim 1, wherein
   the base and the rod are integrated in the breaking device, and
   the base includes a disk portion having a through hole in a thickness direction thereof, and a cylindrical wall surface portion extending from an outer circumference of the disk portion towards the ignition device, and an outer circumferential surface of the cylindrical wall surface portion abuts against the inner circumferential wall surface of the cylindrical housing so as to slide in the axial direction.

\* \* \* \* \*